(No Model.)
T. SEELY.
NUT LOCK.
No. 573,044. Patented Dec. 15, 1896.
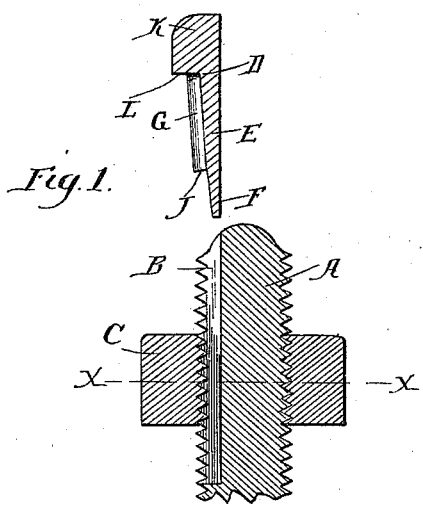
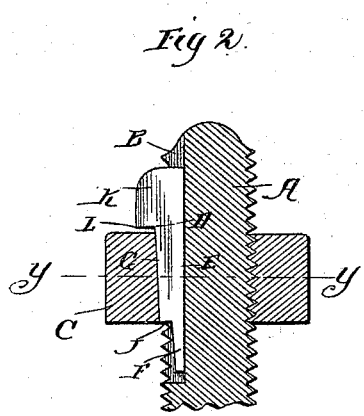
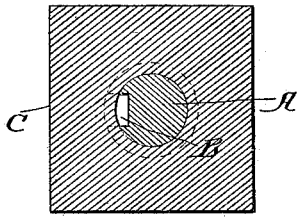
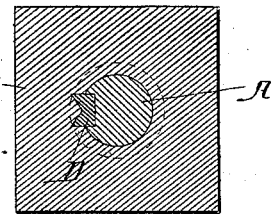
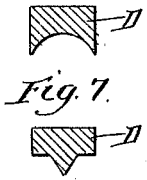
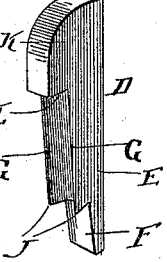
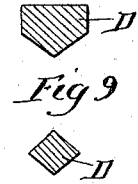
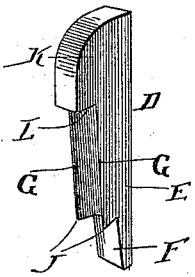
Witnesses:
H. B. Hallock.
S. J. Williamson
Inventor:
Thomas Seely.
by Geo. H. Holgate
Attorney
THE NORRIS PETERS CO., PHOTO-LITHO., WASHINGTON, D. C.

UNITED STATES PATENT OFFICE.

THOMAS SEELY, OF TAMPA, FLORIDA.

NUT-LOCK.

SPECIFICATION forming part of Letters Patent No. 573,044, dated December 15, 1896.

Application filed March 13, 1896. Serial No. 583,025. (No model.)

*To all whom it may concern:*

Be it known that I, THOMAS SEELY, a citizen of the United States, residing at Tampa, in the county of Hillsborough and State of Florida, have invented certain new and useful Improvements in Nut-Locks, of which the following is a specification.

My invention relates to a new and useful improvement in nut-locks, and has for its object to provide such a device that may be secured in any position upon its bolt, from which it cannot be moved by accident or vibration and yet may at any time be unlocked and run off or tightened upon and again locked in a new position.

With these ends in view my invention consists in the details of construction and combination of elements hereinafter set forth and then specifically designated by the claim.

In order that those skilled in the art to which this invention appertains may understand how to make and use the same, I will describe its construction and operation in detail, referring by letter to the accompanying drawings, forming a part of this specification, and in which—

Figure 1 is a central section of a bolt and nut, the former having a groove or spline formed therein for the reception of the locking-key, the latter being shown in a position to be inserted within said groove; Fig. 2, a similar view showing the locking-key after being driven home; Fig. 3, a section at the line $x\ x$ of Fig. 1; Fig. 4, a section at the line $y\ y$ of Fig. 2; Fig. 5, a detailed perspective view of the locking-key; and Figs. 6, 7, 8, and 9, slight modifications in the form of said locking-key.

In carrying out my invention, as shown in Figs. 1, 2, 3, 4, and 5, the bolt A is provided with a spline or groove B, so that when the nut C is run upon said bolt a keyway is formed for the entrance and guidance of the key D, which latter is formed with a body E, prolongated to provide a bit F, for the purpose hereinafter set forth, and this body is grooved to form cutting-ridges G, the ends of which are undercut at J, thereby producing the effect of a cutting-tool or cold-chisel. The key is also provided with a head K, by means of which it may be driven, and the under side of this head forms a shoulder L, adapted to come into contact with the nut when driven home.

In practice the nut, of ordinary construction, after having been run upon the bolt, is locked in any desired position by placing the key in the groove B, the bit serving to pass under the threads of the nut, so as to hold the key against displacement, when the latter is driven with sufficient force for the edges J to cut their way through the threads of the nut, thereby securely locking the nut against rotation, as shown in Figs. 2 and 4.

When the key is being driven home, as just described, a chip will be cut from the nut by each of the cutting edges J, and since the bit is reduced in thickness these chips will pass within the space between the nut and said bit.

If at any time it should become necessary to revolve the nut for the purpose of backing it off the bolt or setting it up still further, this may be accomplished by withdrawing the key and after the nut has been revolved reinserting said key and driving it home, as before described, when it will again make its way by cutting chips from the threads of the nut.

In using my invention I have found that by slightly tapering the ridges G the key will be more firmly embedded in the nut, whereby it will not be so likely to jar loose as would be the case were these ridges parallel with the back of the key.

In the modifications shown in Figs. 6, 7, 8, and 9 I have illustrated several forms of keys in cross-section adapted to produce the same result as that before described, and for certain classes of work a key whose cross-section is an oblique-angled parallelogram, as shown in Fig. 9, is the most advantageous, in that the cost of production is reduced and that a smaller amount of the stock of the bolt is required to be cut away.

Of course it will be understood that any change in the cross-section of the portion of the key which enters the groove B will necessitate a corresponding change in said groove.

Having thus fully described my invention, what I claim as new and useful is—

In a nut-lock, a bolt having a groove formed therein, a nut threaded on said bolt, a key adapted to slide in said groove, said key having a head with a shoulder to limit its movement, cutting-ridges formed on one edge of the key, ending in an undercut forming a shoulder and a pointed cutting-surface and a bit having a beveled surface leading to the undercut portion, as and for the purpose described.

In testimony whereof I have have hereunto affixed my signature in the presence of two subscribing witnesses.

THOMAS SEELY.

Witnesses:
S. S. WILLIAMSON,
E. H. BRACK.